April 25, 1961
V. G. McKENNEY
2,981,927
UNDERWATER SOUND TRANSMITTER
Filed April 4, 1946
4 Sheets-Sheet 1
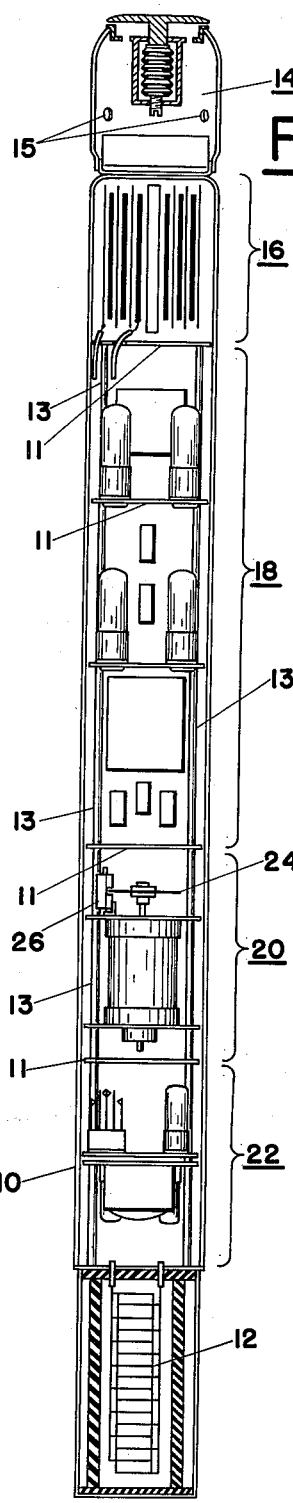
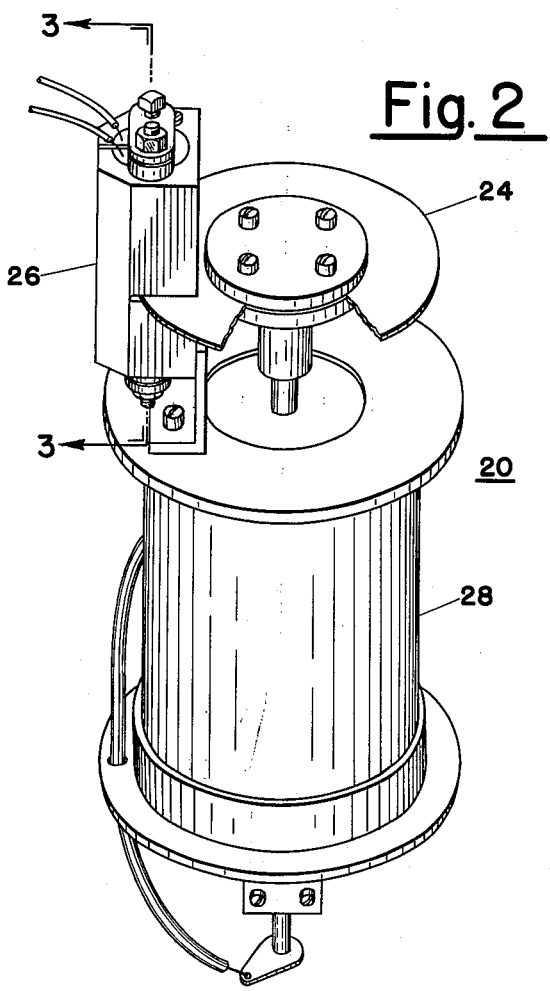
INVENTOR.
VAUGHN G. McKENNEY
BY
*M. A. Hayes*
Attorney April 25, 1961 V. G. McKENNEY 2,981,927
UNDERWATER SOUND TRANSMITTER
Filed April 4, 1946 4 Sheets-Sheet 2
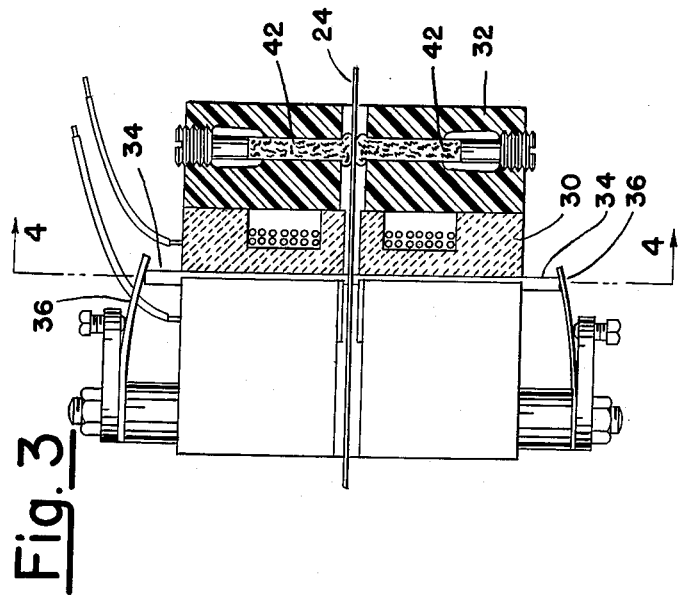
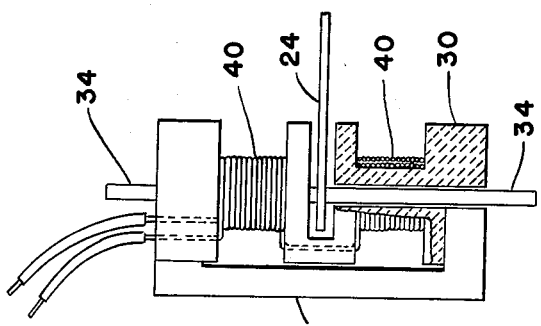
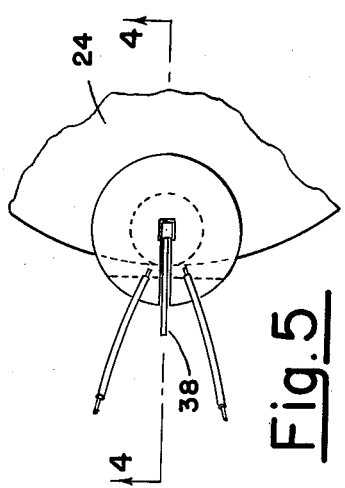
INVENTOR.
VAUGHN G. McKENNEY
BY M. O. Hayes
Attorney April 25, 1961 V. G. McKENNEY 2,981,927
UNDERWATER SOUND TRANSMITTER
Filed April 4, 1946 4 Sheets-Sheet 3

INVENTOR.
VAUGHN G. McKENNEY
BY M. O. Hayes
Attorney

April 25, 1961 V. G. McKENNEY 2,981,927
UNDERWATER SOUND TRANSMITTER
Filed April 4, 1946 4 Sheets-Sheet 4

INVENTOR.
VAUGHN G. McKENNEY
BY
M. O. Hayes
Attorney

United States Patent Office 2,981,927
Patented Apr. 25, 1961

2,981,927

UNDERWATER SOUND TRANSMITTER

Vaughn G. McKenney, San Diego, Calif., assignor to the United States of America as represented by the Secretary of the Navy Filed Apr. 4, 1946, Ser. No. 659,474

3 Claims. (Cl. 340—2)

The present invention relates to underwater noise-makers for interfering with the operation of echo ranging.

The submariner has no adequate weapon against his most dangerous assailants, the destroyers and other anti-submarine craft that are peculiarly fitted for seeking him out and attacking him from the surface. These hunters search him out with echo ranging sound beams, and having found him, run him down and drop lethal explosives near him.

The process of echo ranging performed by the attacking ship consists of sending "pings," or pulses of sound, into the water and detecting the echoes sent back by the submarine. The length of time between the "ping" and the echo is a measure of the distance or "range" of the submarine, and this information, together with the direction from which the echo comes, reveals the submarine's location. Once caught by the probing sound beam of even one attacker, the submarine is at a marked disadvantage, and when there are several after him, his only hope is to shake off the sound contact and make an escape. The ping is usually a substantially pure tone, or single frequency, in the range 10 to 40 kilocycles per second. The attacker's apparatus may be capable of operating at several frequencies, and may also permit the operator to change the frequency from time to time. It has been proposed that a submarine facilitate its evasion by generating noises which are received by the surface ship's echo ranging equipment and confuse the operator, and thereby prevent the attacking vessel from accurately locating the submarine. However, the device proposed must emit sound of all frequencies over a considerable range (from say 10 to 40 kc.) in order to jam the whole band on which the attacker is capable of echo ranging, whereas the only useful part of the noise is a 100 cycle band centered on a frequency the attacker happens to be using at the moment. Consequently, most of the power output is expended in jamming idle frequencies.

A primary object of the present invention is the provision of a jamming transmitter that concentrates its power in a narrow frequency band while still protecting other frequencies. A further object is the provision of a transmitter for jamming echo ranging operations that automatically sets its jamming frequency at the echo ranging frequency, and that shifts to a new frequency if the attacker changes frequency. Other objects include the provision of an expellable sound jammer that records and automatically plays back the echo-ranging tones, and the provision of an improved underwater noisemaker for interfering with echo-ranging.

These and other objects will be apparent from the following description of one embodiment of the invention. In the drawings:

Fig. 1 is a general view, partly in section, of an underwater sound transmitter, or noisemaker, embodying the present invention.

Fig. 2 is a perspective view of a recording and playback device that is included in the transmitter of Fig. 1.

Fig. 3 is partly in section, showing the recording head, and taken approximately along the line 3—3 in Fig. 2.

Fig. 4 is an elevation, partly in section, showing part of the elements of Fig. 3 and taken along the line 4—4 of Figs. 3 and 5.

Fig. 5 is a plan view of the assembly shown in Fig. 4.

Figure 6:
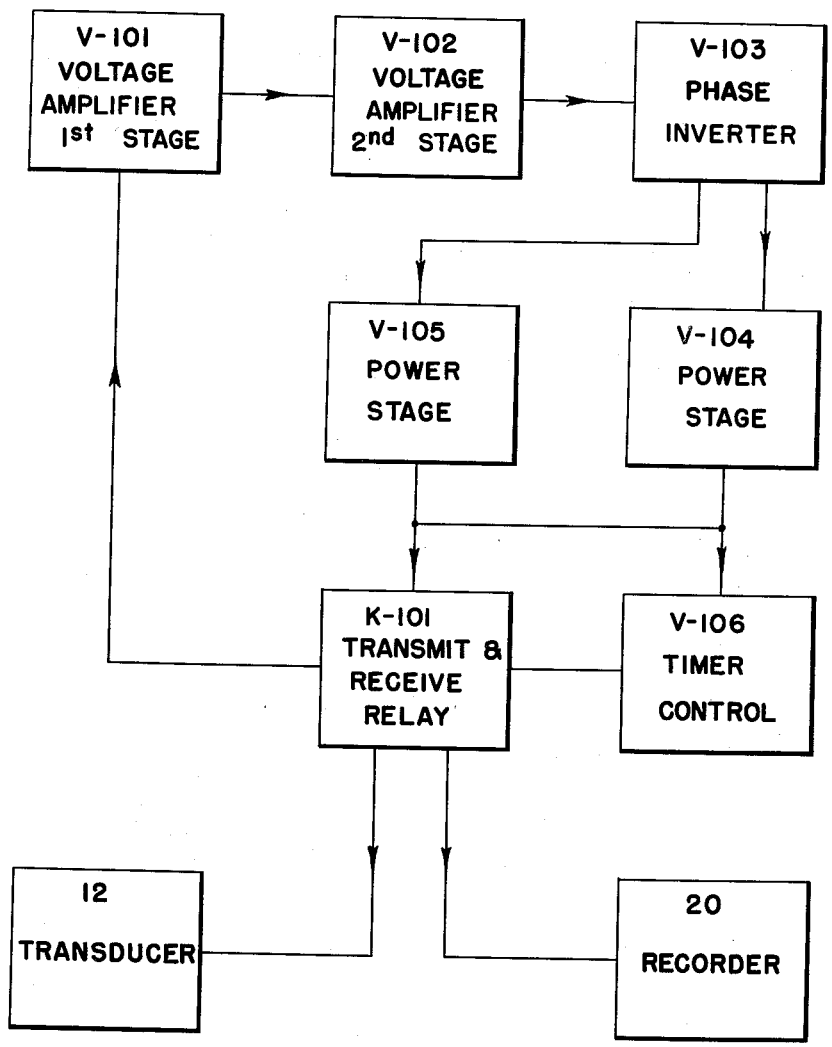
Fig. 6 is a functional block diagram for showing the operation of the transmitter of Fig. 1.

In Fig. 1 an underwater sound transmitter is contained in a cylindrical metal tube 10 of 3 inch maximum diameter and approximately 37 inch length. These dimensions permit the device to be ejected through the flare tube of a submarine. The component parts of the device are supported on discs 11 that are spaced and secured by supports 13. To maintain proper balance so that the device will remain in a vertical attitude when suspended in water, the heavier equipment such as a transducer 12, a high voltage power supply 22, and a recorder 20, are in the lower section of the assembly. An amplifier 18 and a sea cell 16 occupy the upper portion of tube 10. A buoyancy control 14 for supporting the device in the water, is attached at the top of the metal tube 10. It is pressure responsive for regulating the depth at which the noisemaker will operate and it holds the device in a vertical position, first so that the buoyancy control itself will operate effectively, and second, to keep the maximum sensitivity of transducer 12 in a horizontal plane.

When the buoyancy control is not in operation, the device is heavier than water. When the device is launched, water enters ports 15 and activates the chemical in the control which thereupon holds the device at a preset depth in the manner described in the patent of Raymond D. Atchley, United States Patent 2,793,589, dated May 28, 1957. When the buoyancy control is spent, the device sinks.

As shown in Fig. 2, the recorder 20 includes a driving motor 23 which has a centrifugal governor (not shown) for operating it at a substantially constant speed of 6000 r.p.m. It rotates a disc 24 of specially treated iron on which recordings are to be impressed magnetically. A recording head 26 contains a spool 30 (see Figs. 3, 4 and 5) and both this spool and the body 32 are slotted to receive the disc 24. A pair of laminated magnetic pole-pieces 34 guided by a central hole in the spool are held in contact with the disc by springs 36. A yoke completes the magnetic circuit. A two-layer coil 40 on the spool 30 couples the magnetic system to the electric circuits. Oil soaked felt pads 42 bear against the disc 24 to lubricate it and to inhibit vibration.

It has been found that this construction of the magnetic circuit, wherein the pole pieces 34 have a cross section substantially equal to the area of the pole face, facilitates high-level recording and provides a desirable fine-grained record on the disc so that high frequencies may be played back with ample intensity. Also, the construction of coil 40, wherein it is made of small diameter so as to have a low self-inductance (as measured without the iron of the pole pieces 34 or yoke 38), provides a low impedance source for the amplifier during play back.

The general organization of the electric circuits is shown in the block diagram of Fig. 6. Normally, the transducer 12, is connected through relay K-101 to the amplifier consisting of V-101, V-102, V-103, V-104 and V-105, and thence through relay K-101 again to recorder 20, so that normally all sounds picked up are recorded on the magnetic disc 24. However, at 6000 r.p.m. the disc receives a new recording each .010 second. Whenever a loud tone such as an echo-ranging ping is received, the timer V–106 responds to the amplifier output to operate relay K–101 to connect the recorder 20 to the input of the amplifier and the transducer 12 to the output. This operation of relay K–101 requires slightly more than .010 second so that the disc 24 will receive a full record (all around the disc) of the ping. Accordingly the ping tone is retransmitted into the water as a continuous noise. After this operation has continued for about 20 seconds, timer K–101 returns to its normal position so that the system again listens for another ping. Each new recording of a loud tone reduces the intensity of the previous recordings about 6 decibels. Thus the device listens for a "ping," transmits it back into the water for 20 seconds, then listens again. Furthermore, by recording the ping itself and using the record for generating the jamming signal, it automatically jams the last frequency used by the enemy.

Figure 7:
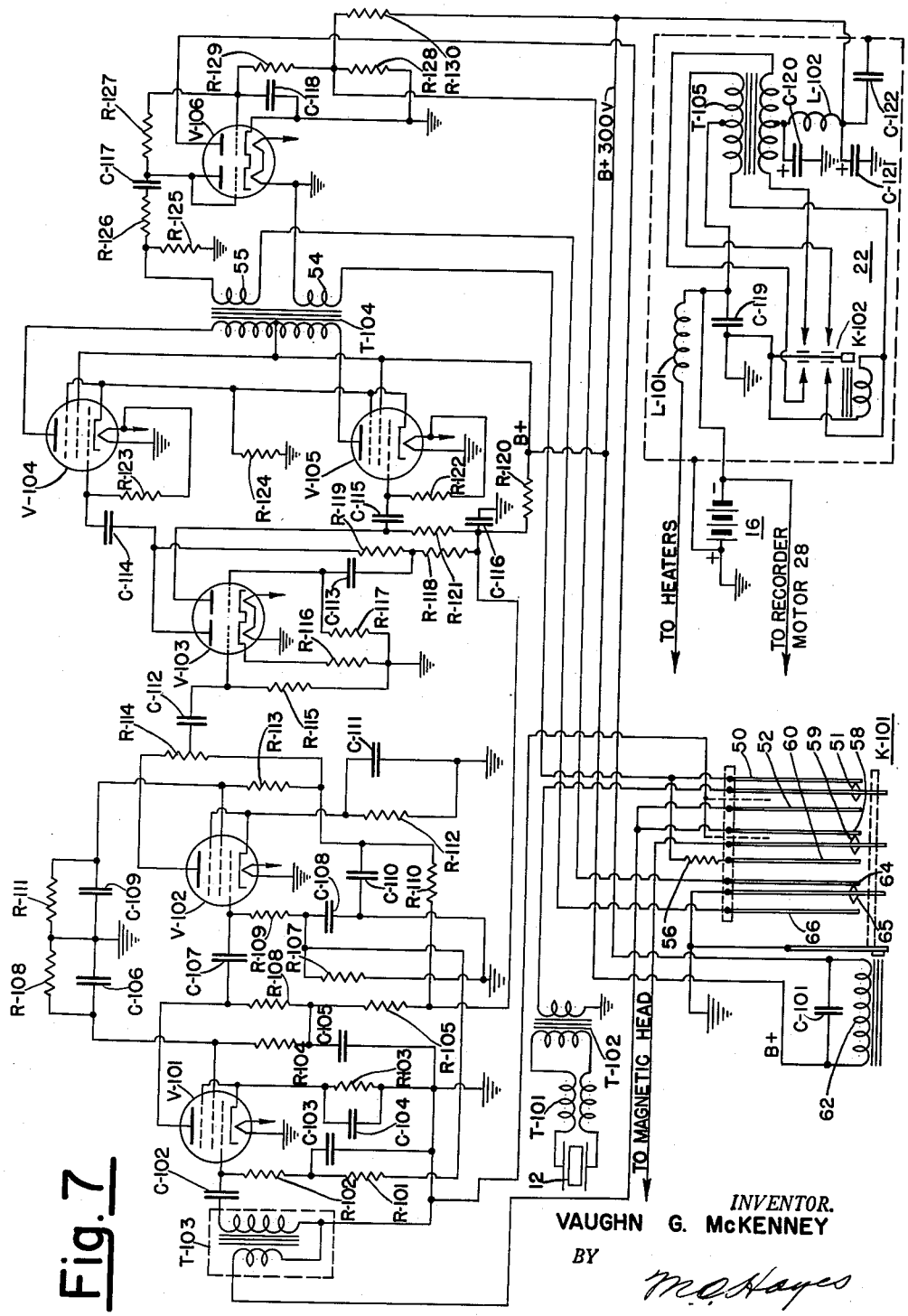
Fig. 7 is a schematic diagram of the electric circuits thereof.

In Fig. 7, relay K–101 is energized during the normal, or listening, period. The electric output from the crystal transducer 12 goes thru transformer T–102 and thru contacts 51 and 52 to transformer T–103 which drives the amplifier which comprises tubes V–101 to V–105 inclusive. This amplifier is arranged to provide good response to all frequencies in the 10 to 40 kc. band. Transformer T–104 which receives the amplifier output has two secondary windings 54 and 55. The signal from winding 54 goes through resistor 56 and through contacts 59 and 60 to the coil 40 (Fig. 4) of the magnetic recording head 26. The output from winding 55 is rectified in one half of tube V–106 (operating as a diode) to charge condenser C–117. The resulting negative voltage is subjected to a time delay by R–127 and C–118 and is applied to the grid of the other half of V–106. If this negative voltage is great enough to overcome the positive bias which is applied to this same grid through R–129 by the voltage divider composed of resistances R–128 and R–130, it reduces the current through coil 62 of relay K–101 so that it drops out. This action requires slightly more than .010 second so that disc 24 will get a full record of the loud tone that operated the relay. Relay K–101, in dropping out, open contacts 65–66 which open the circuit of coil 55 so that it no longer drives tube V–106. At the same time contacts 64–65 close to short out resistor R–128.

The negative charge accumulated on condenser C–118 requires 20 seconds to discharge enough to increase the current through coil 62 to energize relay K–101 again. During this 20 seconds the recording head 26 is connected through contacts 59 and 58 to the input transformer T–103 of the amplifier to drive transducer 12. When the relay is energized at the end of the 20 second transmitting period, the system is restored to normal.

Resistor R–126 limits the rate at which condenser C–117 can be charged so as to prevent the occasional short, intense sounds that appear in the background noise from building up as big a charge as does an echo-range ping, which usually is sustained for 20 milli-seconds or longer. The delay imposed by R–127 and C–118 insures that when the grid voltage is low enough to make relay K–101 release, that voltage will continue to drop so as to insure positive operation of relay K–101. The action of the relay in shorting out resistor R–128 lowers this grid voltage further and also reduces the voltage drop across resistors R–127 and R–129 both of which effects serve to increase the time required for the charge on condenser C–117 to discharge enough to let this half of tube V–106 begin conducting again. Since the time constant of C–118 and resistor R–129 is very much less than one second, and also because the grid draws current when it goes positive, the positive voltage applied to the grid when the short is removed from resistor R–129 (when relay K–101 is energized and opens contacts 64–65) does not appreciably affect the response of tube V–106 to the next "ping."

All electric power is supplied by sea cell 16 which is activated when the sea water wets it. High voltage D.C. is supplied by the vibrator-type generator 22 which includes vibrator K–102, transformed T–105 and filter L–102, C–120, C–121.

Although here illustrated by a specific embodiment, the invention is limited only by the claims.

I claim:

1. In a compact, expendible, self-monitoring, automatic transmitter for jamming underwater echo-ranging operations, the combination with a casing, automatic buoyancy control means, and an electric power supply, of, a single electromechanical transducer, an electronic amplifier, a recorder including a magnetic disc, a motor for driving said disc continuously at substantially constant speed, control means normally connecting said amplifier to record on said disc underwater sounds received by said transducer, and means responsive to the receipt of a signal exceeding a pre-set threshold intensity for operating said control means for connecting said amplifier to drive said transducer from said recorder, said control means being automatically operable for re-connecting the amplifier for recording after a pre-set length of time.

2. In a signal jamming apparatus, a transducer, amplifying means having an input circuit and an output circuit, recording means, switching means for normally connecting said transducer to the input circuit of said amplifying means and said recording means to the output circuit of said amplifying means whereby to record signals received by said transducer, and control means responsive to signals stronger than a predetermined signal strength for a predetermined period of time to operate said switching means to connect said recording means to the input circuit of said amplifying means and said transducer to the output circuit for repetitiously reproducing said recorded signal through said transducer for a predetermined period of time.

3. In a signal jamming apparatus, a transducer, amplifying means having an input circuit and an output circuit, recording means, electromagnetic switch means for normally connecting said transducer to the input circuit of said amplifying means and said recording means to the output circuit of said amplifying means, whereby to record signals arriving at said transducer, a time delay circuit comprising a capacitor charged from the output circuit of said amplifying means, an electronic tube having an anode, a cathode and a control grid, means for energizing said electromagnetic switch means through the anode-cathode circuit of said tube, means for applying a positive bias to the grid of said tube whereby said electromagnetic switch means is normally energized, and means including a resistive capacitive integrating circuit for impressing the charge on said capacitor on the control grid of said tube, whereby a signal of sufficient magnitude and duration charges said capacitor and said integrating circuit to de-energize said electromagnetic switch means and connect said recording means to the input circuit of said amplifying means and said transducer to the output circuit of said amplifying means during the discharging time of said integrating circuit.

References Cited in the file of this patent

UNITED STATES PATENTS

| | | |
|---|---|---|
| 1,610,779 | Hewett | Dec. 14, 1926 |
| 2,134,716 | Gunn | Nov. 1, 1938 |
| 2,276,497 | Kroger | Mar. 17, 1942 |
| 2,378,388 | Begun | June 19, 1945 |
| 2,395,679 | Neuhof | Feb. 26, 1946 |